United States Patent [19]

Crosby et al.

[11] 4,214,142
[45] Jul. 22, 1980

[54] APPARATUS AND PROCESS FOR WELDING PLATED PARTS

[75] Inventors: Alton L. Crosby, Seneca Falls; Harry R. Swank, Waterloo, both of N.Y.

[73] Assignee: GTE Products Corporation, Stamford, Conn.

[21] Appl. No.: 935,232

[22] Filed: Aug. 21, 1978

[51] Int. Cl.² .............................................. B23K 11/30
[52] U.S. Cl. ................................ 219/86.25; 219/86.1; 219/119
[58] Field of Search ................. 219/78.01, 86.1, 86.25, 219/119

[56] References Cited
U.S. PATENT DOCUMENTS

| 2,288,348 | 6/1942 | Funk | 219/78 |
| 2,379,187 | 6/1945 | Richards | 219/119 |
| 2,967,228 | 1/1961 | Tindall | 219/119 |
| 3,194,940 | 7/1965 | Thomson | 219/78.01 |
| 3,267,253 | 8/1966 | Gueugnier | 219/84 |

Primary Examiner—E. A. Goldberg
Attorney, Agent, or Firm—Thomas H. Buffton

[57] ABSTRACT

Apparatus and a process for welding plated ear member to plated rimbands for implosion-resistant cathode ray tube structures is provided. The apparatus includes oppositely disposed electrodes with a central groove in one electrode while the process provides the steps of positioning the ear members and rimbands intermediate the electrodes and energizing the electrodes of a particular configuration in an amount and for a time sufficient to effect welding of the ear members and rimbands.

12 Claims, 3 Drawing Figures

APPARATUS AND PROCESS FOR WELDING PLATED PARTS

TECHNICAL FIELD

This invention relates to a process and apparatus for welding plated parts and more particularly to a process and apparatus for welding plated ear members to plated rimbands for an implosion-resistant cathode ray tube structure.

BACKGROUND OF THE INVENTION

In the fabrication of implosion-resistant cathode ray tube structures, it has been a common practice to provide a pair of rimbands which are placed in contact with the flanged portion of a substantially rectangular-shaped viewing portion of an evacuated envelope. Ear members suitable for attachment to bolts for supporting the cathode ray tube are welded or otherwise attached to the rimbands. Thereafter a metal band member encircles and exerts a compression force on the rimbands and affixed ear members.

Ordinarily, the rimbands and ear members are fabricated from a material such as cold rolled steel and the ear members are affixed to the rimbands. Since the parts are frequently stored for extended periods prior to use, there is a tendency toward undesired rusting and discoloration. However, such conditions were substantially overcome by attaching the ear members to the rimbands and then applying a coating of a material such as zinc to the attached parts prior to storage.

Unfortunately, it has been found that the above-described technique of welding uncoated ear members to uncoated rimbands and then coating the already affixed parts is a most inefficient technique. Particularly, the individual parts are usually decreased at one location, shipped to another for welding, shipped to still another location for plating, returned to the manufacturer for inspection, and finally provided to the factory fabricating the implosion-resistant cathode ray tube structures. Obviously, such complex handling requires an extended lead time and emergency situations at the cathode ray tube manufacturing facility are frequent due to the unavailability or delay in delivery of the required components.

One suggestion for alleviating the above-mentioned undesirable conditions is to provide pre-plated ear members and rimbands. In this manner, the individual parts could be stored for extended periods of time without fear of rust and similar undesirable conditions. Moreover, the pre-plated parts could be readily combined to provide the desired rimband and ear member combinations required.

Unfortunately, prior known techniques for welding plated ear members to plated rimbands have resulted in undesired disfigurement of the ear members. As a result, it was found that the undesired disfigurement or distortions of the ear member tended to inhibit the application of the tensioned metal band. As the metal band was tightened to obtain the desired compressive force, the distortions of the ear member caused an undesirable resistance and the necessary and desirable amount of tension on the rimband was either reduced or unattainable with prior known welded structures of plated materials.

SUMMARY OF THE INVENTION

In one aspect of the invention, apparatus is provided for welding plated ear members to plated rimbands for implosion-resistant cathode ray tube structures. The apparatus includes a means for effecting contact of the plated ear members and rimbands and for energizing first and second electrodes with the second electrode having a surface contour substantially similar to the surface contour of the ear member and a central groove therein which is disposed opposite to the first electrode.

In another aspect of the invention, there is provided a process for welding plated ear members to plated rimbands for use in implosion-resistant cathode ray tube structures. In the process, the plated ear members and rimbands are placed into contacting relationship between first and second electrodes which are energized in an amount sufficient to effect a weld therebetween and the second electrode is formed to have a surface contour substantially similar to the surface contour of the ear members and a groove therein located opposite the positional location of the first electrode.

PREFERRED EMBODIMENT OF THE INVENTION

For a better understanding of the present invention, together with other and further objects, advantages and capabilities thereof, reference is made to the following disclosure and appended claims in connection with the accompanying drawings.

Figure 1:
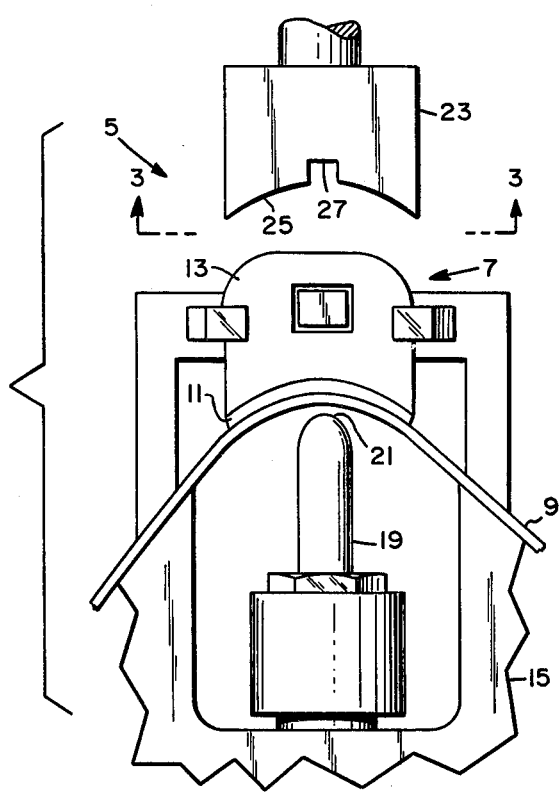
FIG. 1 is a diagrammatic illustration of apparatus for welding plated ear members to plated rimbands prior to the welding operation.

Referring to the drawings, FIG. 1 illustrates a welding apparatus 5 suitable for attaching a plated ear member 7 to a plated rimband 9. The ear member 7 is preferably substantially "L" shaped with a base portion 11 affixed to an upstanding attachment portion 13. Also, the ear member is of half-hard or cold rolled steel of a thickness in the range of about 0.060 to 0.090 inch and is plated with zinc of a thickness in the range of about 0.0001 to 0.0003-inch. Moreover, the rimband 9 is of cold-rolled steel plated with a layer of zinc of a thickness in the range of about 0.0005 to 0.0009-inch.

The welding apparatus 5 includes a first and second support portions, 15 and 17, respectively whereby is upheld the rimband 9 and ear member 7 respectively. A first electrode 19 having a substantially hemi-spherical-shaped welding portion 21 is also supported by the first support portion 15.

In the non-welding positional location of FIG. 1, a second electrode 23 is spaced from the base portion 11 of the ear member 7. This second electrode 23 has a contoured welding surface 25 with a radius of curvature in the range of about 1.0 to 1.65 inches and is substantially similar to the contour of the base portion 11 of the ear member 7.

Figure 3:
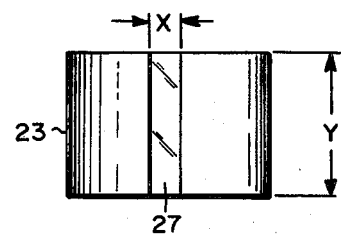
FIG. 3 is a view of a second welding electrode taken along the line 3—3 of FIG. 1.

The second electrode 23 also has a groove 27 in the welding surface 25. This groove, which can be seen in FIG. 3, has a depth of at least 0.030 inches and preferably 0.050 inches and a width "X" in the range of about 0.350 to 0.400 inches. Moreover, the groove 27 extends throughout the length "Y" of the electrode 23.

Figure 2:
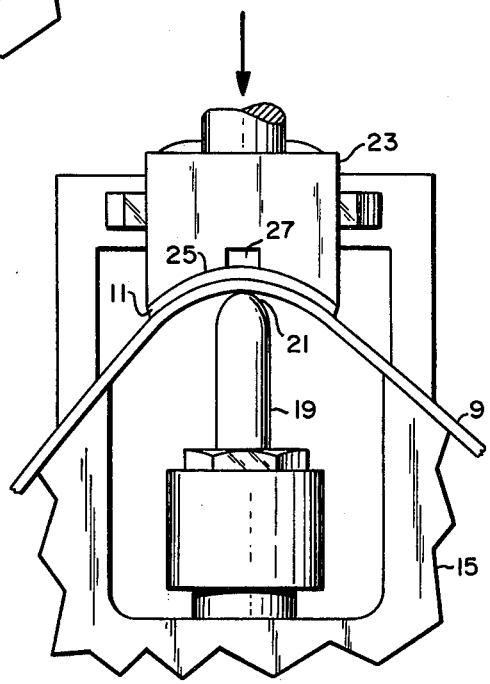
FIG. 2 diagrammatically illustrates the apparatus of FIG. 1 in the actual welding operation position.

As can be seen in the welding position of FIG. 2, the rimband 9 and base portion 11 of the ear member 7 are disposed intermediate to and in contact with the first and second electrodes 19 and 23. More specifically, the welding portion 21 of the first electrode 19 is disposed opposite to the groove 27 of the second electrode 23. Moreover, the welding surface 25 of the second electrode 23 substantially conforms to and contacts the contour of the base portion 11 of the ear member 7.

Thereupon, the first and second electrodes 19 and 23 are energized in an amount and for a time sufficient to effect welding of the plated ear member 7 to the plated rimband 9. For example, it has been found that about 3-weld cycles at 1500 amperes and a voltage of about 1.0 volts as measured across the first and second electrodes 19 and 23 provides a weld which is not disfiguring or deleterious to the surface of the base portion 11 of the ear member 7. Thus, an encircling metal band may be applied thereto and a compressive force exerted thereon without undesired resistance to the tensional force exerted on the metal band, or scratching of the surface of the band causing subsequent failure of the band under stresses due to tensions applied or corrosion of the area which had been scored.

In the process of welding the plated rimband 9 and ear member 7, the rimband 9 and ear member 7 are positioned intermediate and in contact with first and second electrodes 19 and 23 which are energized in an amount sufficient to effect the desired welding without deformation. Moreover, the above-mentioned welding without deformation is effected due to the formation of the second electrode 23 having a contour 25 substantially similar to the contour of the base portion 11 of the ear member 7 and a slot 27 therein which is disposed opposite to the first electrode 19.

While there has been shown and described what is at present considered the preferred embodiment of the invention, it will be obvious to those skilled in the art that various changes and modifications may be made therein without departing from the invention as defined by the appended claims.

INDUSTRIAL APPLICABILITY

Thus, there has been provided a unique apparatus and process for welding plated members suitable for use in the fabrication of implosion-resistant cathode ray tubes. This unique welding apparatus and process includes a welding electrode having a welding surface of a contour substantially similar to the contour of the plated ear member as well as a groove therein whereby the welding is effected without deleterious distortion of the ear member.

We claim:

1. In a process for welding plated rimbands and plated ear members having base and upstanding portions and suitable to an implosion-resistant cathode ray tube wherein the plated rimbands and ear members base portion are placed in contacting relationship between first and second electrodes which are energized in an amount and for a time sufficient to effect welding thereof, the improvement comprising the step of forming said second electrode to have a surface contour substantially similar to the surface contour of said base portion of the ear member and a slot therein positionally located substantially opposite to said first electrode.

2. The process of claim 1 wherein said rimbands and ear members are fabricated of cold-rolled steel and plated with a coating of zinc.

3. The process of claim 1 wherein said second electrode has a slot extending therein of a depth not less than about 0.030 inch and a width in the range of about 0.350 to 0.400 inch.

4. The process of claim 1 wherein said second electrode has a radius in the range of about 1.0 to 1.65 inch.

5. The process of claim 1 wherein said first electrode has a contour in the form of a substantially hemispherical radius and said second electrode has a contour substantially similar to the contour of said ear members.

6. The process of claim 1 wherein said rimbands are fabricated of cold-rolled steel and coated with zinc in the range of about 0.0005 to about 0.0009 inch thick.

7. The process of claim 1 wherein said ear members are fabricated from half-hard or cold-rolled steel with a thickness in the range of about 0.060 to 0.090 inch and coated with zinc having a thickness in the range of about 0.0001 to 0.0003 inch.

8. The process of claim 1 wherein said energization of said electrodes is effected in approximately three (3) weld cycles at 1500 amperes and a voltage of about 1.0 volts as measured across said first and second electrodes.

9. An apparatus for welding plated rimbands and the base portion of plated ear members including first and second electrodes and means for positioning the plated rimbands and base portion of the plated ear member in contact between the electrodes and means for energizing the electrodes in an amount and for a time sufficient to effect welding of the plated rimband and plated ear member, the improvement comprising a first electrode having a given contact surface and a second electrode having a surface contour substantially similar to the surface contour of the base portion of said plated ear member with a centrally located cavity therein disposed opposite to said first electrode.

10. The apparatus of claim 9 wherein said cavity of said second electrode has a depth not less than about 0.030 inch.

11. The apparatus of claim 9 wherein said second electrode has a radius in the range of about 1.0 to 1.65 inch.

12. The apparatus of claim 9 wherein is provided about three (3) weld cycles at about 1500 amperes and a voltage of 1.0 volts as measured across said first and second electrodes.

* * * * *